United States Patent
Molinaro et al.

(10) Patent No.: US 6,648,127 B2
(45) Date of Patent: Nov. 18, 2003

(54) CONVEYOR BELT WITH ADVERTISING AND METHOD OF MAKING SAME

(76) Inventors: Joseph J. Molinaro, 8101 Toltec Dr., North Little Rock, AR (US) 72116; Mark Witcher, 1808 Forston Rd., Jacksonville, AR (US) 72076; Greg Wren, 48 Shady Valley Ct., Conway, AR (US) 72020

( * ) Notice: Subject to any disclaimer, the term of this patent is extended or adjusted under 35 U.S.C. 154(b) by 57 days.

(21) Appl. No.: 10/086,659

(22) Filed: Feb. 28, 2002

(65) Prior Publication Data

US 2003/0159904 A1 Aug. 28, 2003

(51) Int. Cl.[7] ............................................... B65G 43/00
(52) U.S. Cl. .................................................... 198/502.1
(58) Field of Search ...................................... 198/502.1

(56) References Cited

U.S. PATENT DOCUMENTS

| | | | | |
|---|---|---|---|---|
| 4,201,002 A | * | 5/1980 | Barton ........................ | 40/524 |
| 4,979,591 A | * | 12/1990 | Habegger et al. ............ | 186/68 |
| 5,244,080 A | * | 9/1993 | Bierbaum ................ | 198/502.1 |
| 5,280,831 A | * | 1/1994 | Conklin, Jr. ............. | 198/502.1 |
| 5,358,094 A | * | 10/1994 | Molinaro et al. ......... | 198/502.1 |
| 5,427,227 A | * | 6/1995 | Crandall et al. .......... | 198/502.1 |
| 5,596,828 A | * | 1/1997 | Smallwood ................... | 40/524 |
| 5,620,061 A | * | 4/1997 | Fraser .......................... | 186/68 |
| 6,082,525 A | * | 7/2000 | Vonholm et al. ......... | 198/502.1 |
| 6,103,349 A | * | 8/2000 | Matsumoto ................. | 428/192 |
| 6,186,314 B1 | * | 2/2001 | Conklin, Jr. ............. | 198/502.1 |
| 6,276,515 B1 | * | 8/2001 | Wayer ..................... | 198/502.1 |

\* cited by examiner

*Primary Examiner*—Christopher P. Ellis
*Assistant Examiner*—Rashmi Sharma
(74) *Attorney, Agent, or Firm*—David A. Belasco; Belaco Jacobs & Townsley, LLP

(57) ABSTRACT

A conveyor belt with advertising is fabricated by coating at least one flexible belting member with a vinyl size coating. A white base coat is applied over the vinyl size coating. A variety of printing processes may be used to print registered color separation images on the belting member. These processes include silkscreen, flexographic and offset printing. The belting members may be made in lengths shorter than the entire length of the conveyor belt with removable attachment means, permitting individual advertising images to be replaced without replacing the entire conveyor belt. Methods for fabricating the belting members including ink formulations, handling and drying steps are also described.

7 Claims, 4 Drawing Sheets

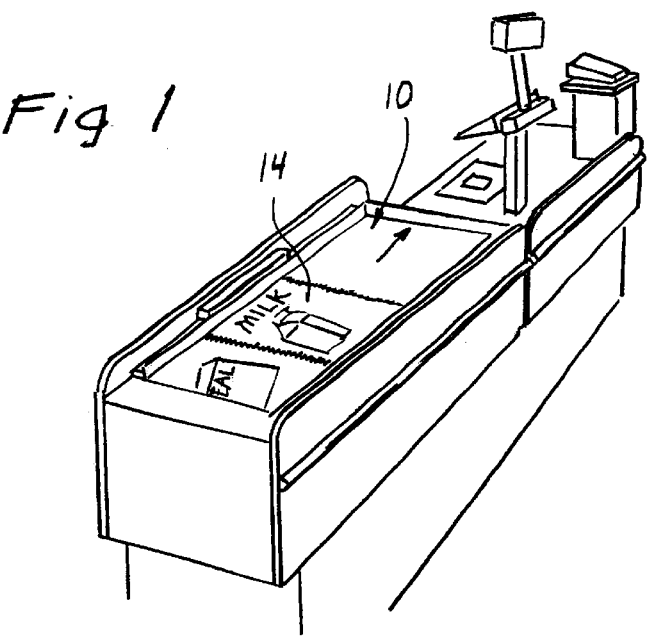
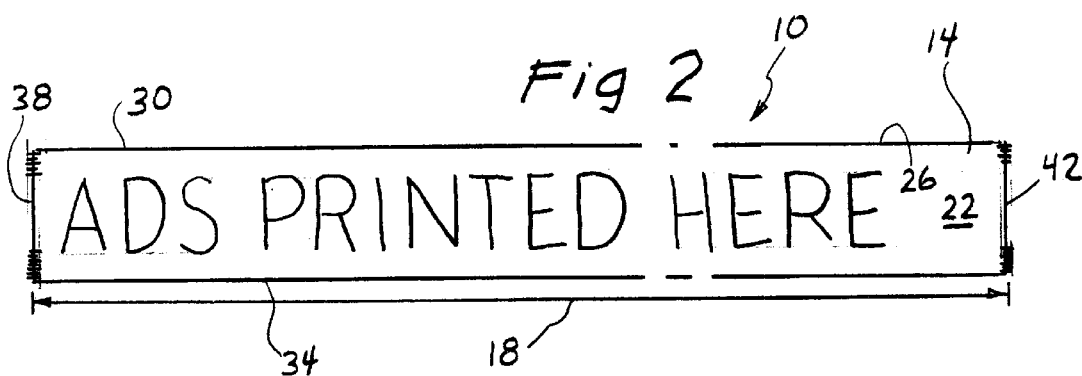
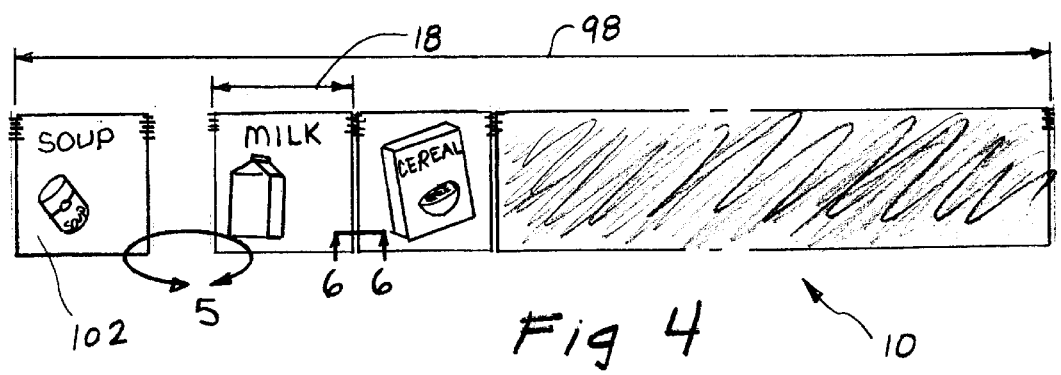

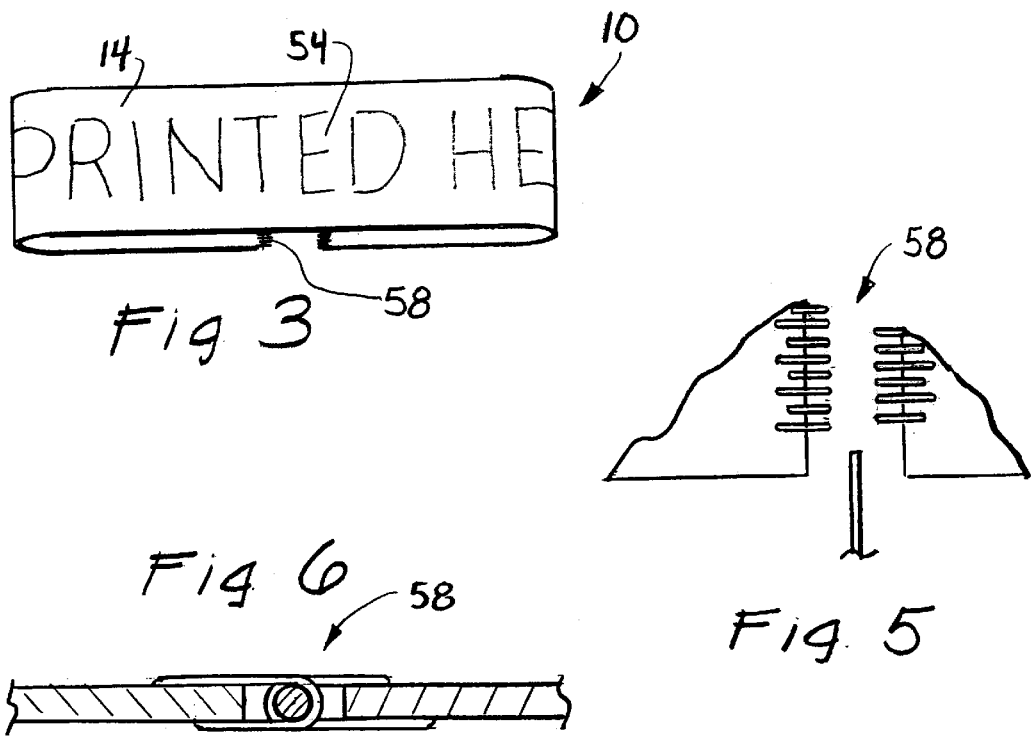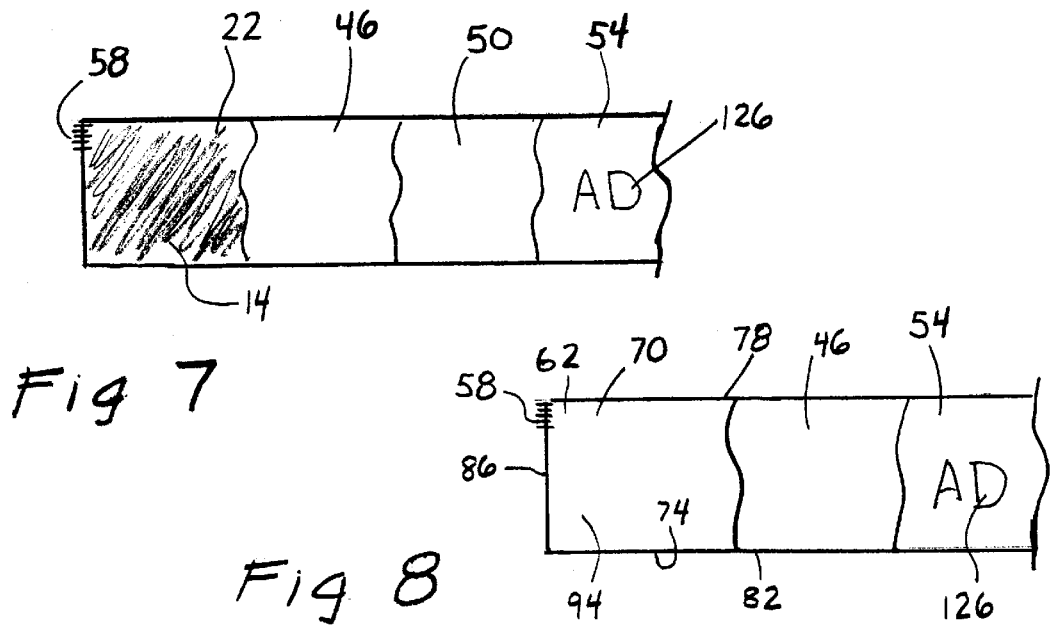

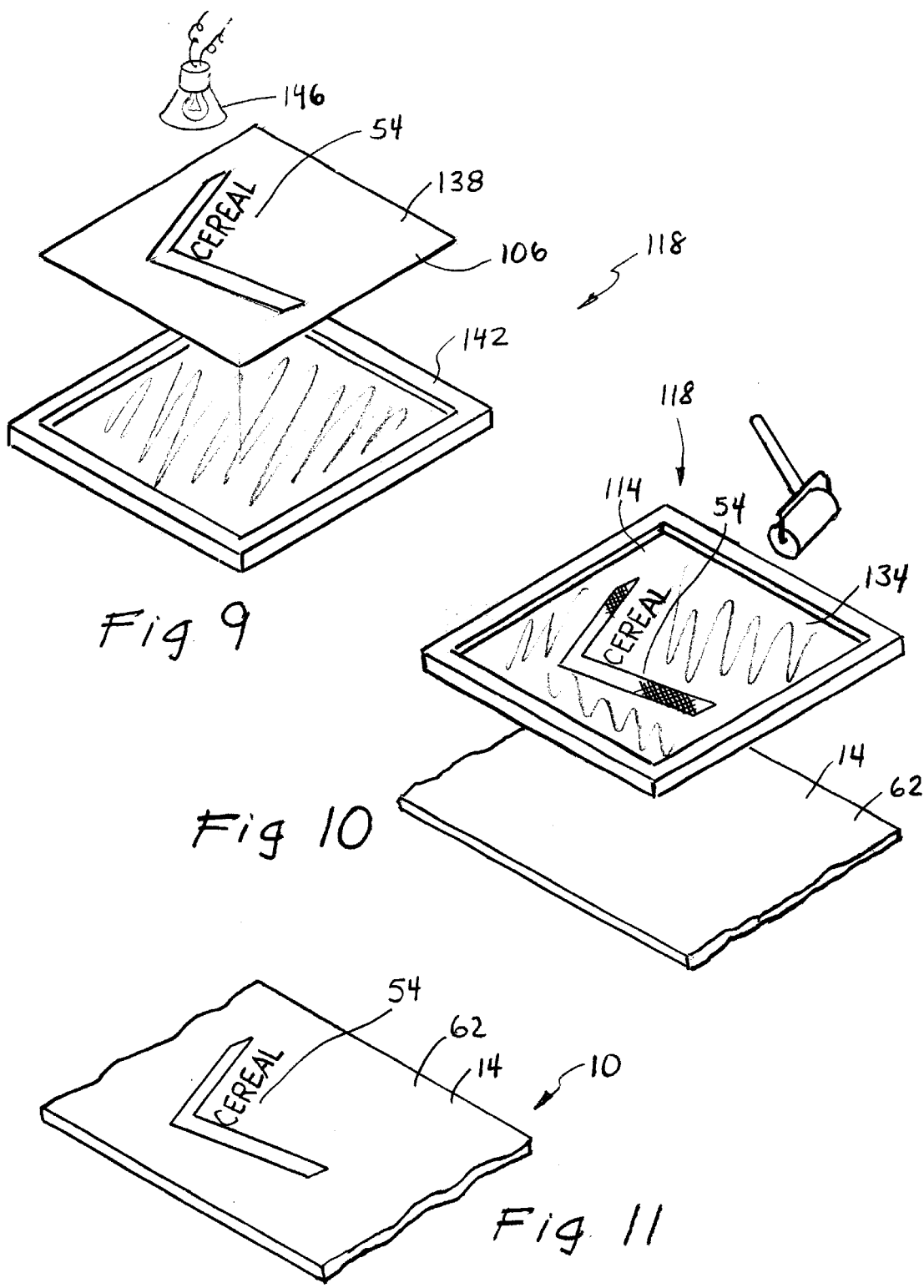

CONVEYOR BELT WITH ADVERTISING AND METHOD OF MAKING SAME

FIELD OF INVENTION

The invention pertains to surface treatments for conveyor belts. More particularly, the invention relates to conveyor belts having advertisements printed on an outer surface for viewing by consumers in retail establishments and methods of fabricating such belts.

BACKGROUND OF THE INVENTION

Various techniques have been developed for using the surface area of conveyor belts in supermarkets and other retail establishments as advertising space. Making effective use of this space has often been problematic due to the flexible nature of the conveyor belts, the continuous wear associated with objects placed on the belts and the relative complexity of systems designed to deal with these problems.

U.S. Pat. No. 6,082,525 issued to Vonholm et al. is directed to a method for application of removable information and advertising indicia on a conveyor belt in cashier counters in grocery stores, airports, etc. The method includes use of a heat/pressure press to press down parts of the conveyor belt to form recesses in the conveyor belt surface. Foil/sticker advertising media are inserted into the recesses.

U.S. Pat. No. 5,596,828 issued to Smallwood, discloses a an endless belt display device incorporating a transparent panel having all but one edge bonded to the top surface of the belt. The open edge provides a pocket in the transparent panel in which advertising media may be placed. The unbonded edge and the top edge of the transparent panel are in direct contact with one another as the belt is rotated. Means are provided for tightening and loosening the belt to allow replacement of the advertising media. Pat. No. WO 00/69759, issued to Payne is directed to a conveyor belt comprising a substrate layer with an information display formed on the uppermost surface thereof. One or more transparent or translucent coating layers of a thermosetting plastic material overlay the substrate layer such that the information is visible through the coating layers.

Pat. No. EP 0 478 866 A1 issued to Munkner is directed to precut posters printed with advertisement that are adhered to belt-plates forming a conveyor belt as at an airport luggage conveyor. The posters are formed of polyethylene or similar synthetics on which advertising messages are printed in indelible scratch-free inks and secured in place with pressure sensitive adhesives or similar adhesive emulsions over the belt-plates of a conveyor.

U.S. Pat. No. 5,358,094 issued to Molinaro et al., the present inventor, reference is directed to checkout conveyor belts incorporating changeable display advertising. The changeable advertising media is printed on static cling sheets that are adhered to the conveyor belt by electrostatic attraction or low friction coating applied to the visible surface of the static cling sheets. An adhesive strip is alternatively employed to secure the leading edge of the static cling sheet to the outer surface of the belt.

While other variations exist, the above-described inventions for providing advertising on conveyor belts are typical of those encountered in the prior art. It is an objective of the present invention to provide advertising on conveyor belts that is bright, colorful and resistant to chemical spills and abrasion. It is a further objective to provide such advertising through methods that are economical and can be easily reproduced. It is a still further objective of the invention to provide the above-described features in a conveyor belt that will resist cracking of the advertising images as the belt is flexed and as it expands and contracts due to temperature changes. While some of the objectives of the present invention are disclosed in the prior art, none of the inventions found include all of the requirements identified.

SUMMARY OF THE INVENTION

The present invention addresses all of the deficiencies of prior art conveyor belts with advertising and methods of making same and satisfies all of the objectives described above.

A conveyor belt with advertising providing the desired features may be constructed from the following components. At least one belting member, the belting member has a first predetermined length, an upper surface, a lower surface, first and second parallel side edges and first and second ends. At least one advertising image is provided. The advertising image is printed upon the upper surface. Means are provided for removably attaching one of the first ends to one of the second ends.

In a variant of the invention, at least one belting member is provided. The belting member has a first predetermined length, an upper surface, a lower surface, first and second parallel side edges and first and second ends. A white base coating is provided. The white base coating is adhered to the upper surface. At least one advertising image is provided. The advertising image is printed upon the white base coating. Means are provided for removably attaching one of the first ends to one of the second ends.

In another variant, at least one belting member is provided. The belting member has a first predetermined length, an upper surface, a lower surface, first and second parallel side edges and first and second ends. A vinyl size coating is provided. The vinyl size coating is applied to the upper surface. A white base coating is provided. The white base coating is adhered to the upper surface over the vinyl size coating. At least one advertising image is provided. The advertising image is printed upon the white base coating. Means are provided for removably attaching one of the first ends to one of the second ends.

In still another variant, at least one belting member is provided. The belting member has a first predetermined length, an upper surface, a lower surface, first and second parallel side edges and first and second ends. The belting member is formed of either white or light-colored material. A vinyl size coating is provided. The vinyl size coating is applied to the upper surface. At least one advertising image is provided. The advertising image is printed upon the vinyl size coating. Means are provided for removably attaching one of the first ends to one of the second ends.

In a further variant, the belting member is formed of materials having anti-static properties.

In still a further variant, the belting member is formed of polyvinyl chloride material and the upper surface has a matte smooth surface having a hardness ranging from 80 to 90 duro.

In yet a further variant, the predetermined length of the belting member is less than an entire length of the conveyor belt, permitting replacement of a portion of the entire length of the conveyor belt.

In another variant of the invention, a method for making a conveyor belt for use in a retail establishment, includes the following steps: Developing advertising images for printing onto at least one belting member. Preparing a color separation image for each color to be printed on the belting member for the advertising image. Preparing means to print each of the color separation images successively onto the belting member. The separation images are to be printed in registration with one another. Providing at least one belting member. The belting member having a first predetermined length, an upper surface, a lower surface, first and second parallel side edges and first and second ends. Cleaning the belting member to remove any contaminants. Coating the upper surface of the belting member with a vinyl size material. Applying a white base coating to the upper surface over the vinyl size material. Printing each of the color separation images successively onto the belting member in registration with one another. Curing the advertising image on the belting member. Supporting the belting member to prevent either of flexing and contact with the advertising image for a predetermined post cure period. Inspecting the belting members for printing defects. Connecting attaching means to each of the first and second ends.

In still another variant, a method for making a conveyor belt for use in a retail establishment, includes the following steps: Developing advertising images for printing onto at least one belting member. Preparing a color separation image for each color to be printed on the belting member for the advertising image. Preparing means to print each of the color separation images successively onto the belting member. The separation images are to be printed in registration with one another. Providing at least one belting member, the belting member having a first predetermined length, an upper surface, a lower surface, first and second parallel side edges and first and second ends. The belting member is formed of either white or light-colored material. Cleaning the belting member to remove any contaminants. Coating the upper surface of the belting member with a vinyl size material. Printing each of the color separation images successively onto the belting member in registration with one another. Curing the advertising image on the belting member. Supporting the belting member to prevent either of flexing and contact with the advertising image for a predetermined post cure period. Inspecting the belting members for printing defects. Connecting attaching means to each of the first and second ends.

In still a further variant of the invention, the advertising images are prepared in digital format and the color separation images are produced from the digital format.

In yet a further variant, the means to print each of the color separation images successively onto the belting member is a silkscreen process.

In another variant, the means to print each of the color separation images successively onto the belting member is an offset printing process.

In still another variant, the means to print each of the color separation images successively onto the belting member is a flexographic printing process.

In yet another variant, the belting member is formed of materials having anti-static properties.

In yet a further variant, the belting member is formed of polyvinyl chloride material and the upper surface has a matte smooth surface having a hardness ranging from 80 to 90 duro.

In still a further variant of the invention, the belting member is cleaned using a solution that includes agents chosen from the group including: methyl alcohol and toluene.

In another variant, the advertising image to be printed is composed of only spot colors and the inks printed on the belting member are conventional inks.

In yet another variant, the advertising image to be printed is a four-color process image and the inks printed on the belting member are ultraviolet ink.

In still another variant, the inks are cured using an ultraviolet light source, the ultraviolet light source having a power rating from 100 watts to 300 watts.

In a further variant of the invention, the belting member is moved under the ultraviolet light source at a speed ranging from 20 to 40 feet per minute.

In yet a further variant, the post cure period ranges from 48 to 72 hours.

In still a further variant, a method for making a conveyor belt for use in a retail establishment further includes the steps of: Preparing a silkscreen for each color separation image. Registering a first of the silk screens to the belting member. Printing a first color ink on the belting member through the first silkscreen over the white base coating. Removing the first silkscreen. Registering, printing through and removing succeeding silk screens for each additional color ink for each advertising image.

In yet a another variant, a method for making a conveyor belt for use in a retail establishment further includes the steps of: Preparing a silkscreen for each color separation image. Registering a first of the silk screens to the belting member. Printing a first color ink on the belting member through the first silkscreen. Removing the first silkscreen. Registering, printing through and removing succeeding silk screens for each additional color ink for each advertising image.

In still another variant of the invention, a method for making a conveyor belt for use in a retail establishment wherein the preparation of a silkscreen for each color separation image further includes the steps of: Preparing a film negative for each color separation image. Preparing a frame for each silkscreen. Tensioning and securing each silkscreen to one of the frames. Registering the film negative on the silkscreen. Exposing the silkscreen to a metal halide light source for a period of time ranging from four to seven minutes. Removing the film negative from the silkscreen.

In a further variant, the film negative is capable of yielding an image having a resolution of at least 84 lines per screen and 600 dots per inch.

In still a further variant, the silk screens are tensioned on the frames with a force 14–25 newtons.

In yet a further variant, the silkscreen has a mesh count ranging between 230 and 420 cells per square inch.

In another variant, the ink is comprised of an adhesion component and a colored ink component.

In still another variant, the adhesion component is comprised of an adhesion promoter and a mixing clear agent, the adhesion promoter is 0.05% to 20% of the adhesion component by weight with the mixing clear agent is the corresponding percentage of the adhesion component by weight.

In yet another variant, the ink is comprised of 0.05% to 20% adhesion component by weight with the colored ink component is the corresponding percentage of the ink by weight.

In a further variant, the colored ink component is comprised of: acrylated oligomers 20–55% by weight, n-vinyl-2 pyrrolidone 12–25% by weight, and acrylated monomers 8–20% by weight.

In still a further variant, the adhesion promoter is comprised of: urethane 10–20% by weight, xylen 20–25% by weight and n-vinyl pyrrolidone 10–20% by weight.

In yet a further variant, the mixing clear agent is comprised of: acrylated monomers 20–60% by weight, furanone 5–10% by weight and cyclohexanome 10–20% by weight.

In a final variant of the invention, the vinyl size material is comprised of: methyl isobutyl ketone 10–20% by weight, 1,3,6-trimethylbenzene 5–10% by weight, xylene 1–5% by weight, vinyl resin 6–10% by weight, light aromatic solvent naptha 20–30% by weight, isophorone 5–10% by weight, vinyl chloride-vinyl acetate-maleic acid terpolyme 1–5% by weight, pseudocumene 20–30% by weight, and cumene 1–5% by weight.

An appreciation of the other aims and objectives of the present invention and an understanding of it may be achieved by referring to the accompanying drawings and the detailed description of a preferred embodiment.

DESCRIPTION OF THE DRAWINGS

FIG. 1 is a perspective view of the preferred embodiment of the invention including multiple advertising images printed on a belting member;

FIG. 2 is a plan view of a belting member with printed advertising thereon;

FIG. 3 is a perspective view of a belting member curved for joining as a conveyor belt;

FIG. 4 is a plan view of a series of belting members with printed advertising that may be joined to form a conveyor belt;

FIG. 5 is a plan view of a means for joining belting member ends together along the line 5—5;

FIG. 6 is a side view of a means for joining belting member ends together along the line 6—6;

FIG. 7 is a plan view of the FIG. 1 embodiment of the invention including advertising images printed on a belting member having a black colored upper surface, illustrating the vinyl sizing, white base coating and ink layers of coating applied;

FIG. 8 is a plan view of the FIG. 1 embodiment of the invention including advertising images printed on a belting member having a white or light colored upper surface, illustrating the vinyl sizing and ink layers of coating applied;

FIG. 9 is a perspective view of a color separation image being used to prepare a silkscreen for making the FIG. 1 embodiment;

FIG. 10 is a perspective view of a silkscreen process for making the FIG. 1 embodiment; and FIG. 11 is a perspective view of the belting member after the silkscreen process has been used for making the FIG. 1 embodiment.

DETAILED DESCRIPTION OF THE PREFERRED EMBODIMENT

Figure 8A:
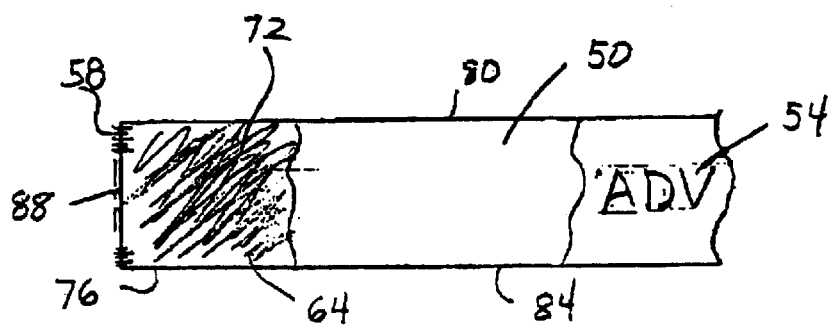
FIG. 8A is a plan view of the FIG. 1 embodiment of the invention including advertising images printed on a belting member illustrating the white base coating and ink layers applied.
Figure 7A:
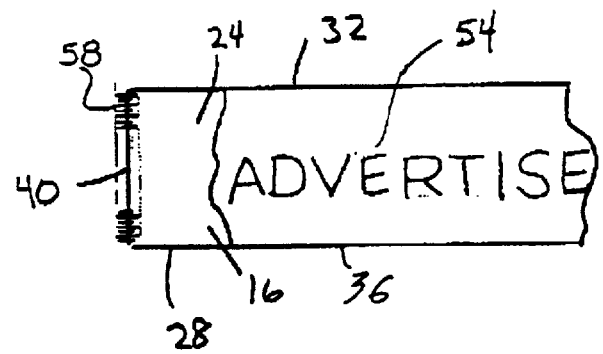
FIG. 7A is a plan view of the FIG. 1 embodiment of the invention including advertising images printed on a belting member illustrating the ink layer of coating applied.

FIGS. 1–8 illustrate a conveyor belt with advertising 10 providing the desired features that may be constructed from the following components. As illustrated in FIG. 7A, at least one belting member 16 is provided. The belting member 16 has a first predetermined length (not shown), an upper surface 24, a lower surface 28, first 32 and second 36 parallel side edges and first 40 and second (not shown) ends. At least one advertising image 54 is provided. The advertising image 54 is printed upon the upper surface 24. Means 58 are provided for removably attaching one of the first ends 40 to one of the second ends.

In a variant of the invention, as illustrated in FIG. 8A, at least one belting member 64 is provided. The belting member 64 has a first predetermined length (not shown), an upper surface 72, a lower surface 76, first 80 and second 84 parallel side edges and first 88 and second (not shown) ends. A white base coating 50 is provided. The white base coating 50 is adhered to the upper surface 76. At least one advertising image 54 is provided. The advertising image 54 is printed upon the white base coating 50. Means 58 are provided for removably attaching one of the first ends 88 to one of the second ends.

In another variant of the invention, at least one belting member 14 is provided. As illustrated in FIG. 2, the belting member 14 has a first predetermined length 18, an upper surface 22, a lower surface 26, first 30 and second 34 parallel side edges and first 38 and second 42 ends. As illustrated in FIG. 7, a vinyl size coating 46 is provided. The vinyl size coating 46 is applied to the upper surface 22. A white base coating 50 is provided. The white base coating 50 is adhered to the upper surface 22 over the vinyl size coating 46. At least one advertising image 54 is provided. The advertising image 54 is printed upon the white base coating 50. Means 58 are provided for removably attaching one of the first ends 38 to one of the second ends 42.

In still another variant of the invention, as illustrated in FIG. 8, at least one belting member 62 is provided. The belting member 62 has a first predetermined length (not shown), an upper surface 70, a lower surface 74, first 78 and second 82 parallel side edges and first 86 and second (not shown) ends. The belting member 62 is formed of either white or light-colored material 94. A vinyl size coating 46 is provided. The vinyl size coating 46 is applied to the upper surface 70. At least one advertising image 54 is provided. The advertising image 54 is printed upon the vinyl size coating 46. Means 58 are provided for removably attaching one of the first ends 86 to one of the second ends.

In a further variant, the belting member 14, 62 is formed of materials having anti-static properties.

In still a further variant, the belting member 14, 62 is formed of polyvinyl chloride material and the upper surface 22, 70 has a matte smooth surface having a hardness ranging from 80 to 90 duro.

In yet a further variant, as illustrated in FIG. 4, the predetermined length 18, 66 of the belting member 14, 62 is less than an entire length 98 of the conveyor belt 10, permitting replacement of a portion 102 of the entire length 98 of the conveyor belt 10.

In another variant of the invention, as illustrated in FIGS. 7 and 9–11, a method for making a conveyor belt 10 for use in a retail establishment, includes the following steps: Developing advertising images 54 for printing onto at least one belting member 14. Preparing a color separation image 106 for each color to be printed on the belting member 14 for the advertising image 54. Preparing means 114 to print each of the color separation images 106 successively onto the belting member 14. The separation images 106 are to be printed in registration with one another. Providing at least one belting member 14. The belting member 14 has a first predetermined length 18, an upper surface 22, a lower surface 26, first 30 and second 34 parallel side edges and first 38 and second 42 ends. Cleaning the belting member 14 to remove any contaminants. Coating the upper surface 22 of the belting member 14 with a vinyl size material 46. Applying a white base coating 50 to the upper surface 22 over the vinyl size material 46. Printing each of the color separation images 106 successively onto the belting member 14 in registration with one another. Curing the advertising image 54 on the belting member 14. Supporting the belting member 14 to prevent either flexing or contact with the advertising image 54 for a predetermined post cure period. Inspecting the belting member 14 for printing defects. Connecting attaching means 58 to each of the first 38 and second 42 ends.

In still another variant, as illustrated in FIGS. 8 and 9–11, a method for making a conveyor belt 10 for use in a retail establishment, includes the following steps: Developing advertising images 54 for printing onto at least one belting member 62. Preparing a color separation image 106 for each color to be printed on the belting member 62 for the advertising image 54. Preparing means 114 to print each of the color separation images 106 successively onto the belting member 62. The separation images 106 are to be printed in registration with one another. Providing at least one belting member 62. The belting member 62 having a first predetermined length, an upper surface 70, a lower surface 74, first 78 and second 82 parallel side edges and first 86 and second 90 ends. The belting member 62 is formed of either white or light-colored material 94. Cleaning the belting member 62 to remove any contaminants. Coating the upper surface 70 of the belting member 62 with a vinyl size material 46. Printing each of the color separation images 106 successively onto the belting member 62 in registration with one another. Curing the advertising image 54 on the belting member 62. Supporting the belting member 62 to prevent either of flexing and contact with the advertising image 54 for a predetermined post cure period. Inspecting the belting members 54 for printing defects. Connecting attaching means 58 to each of the first 86 and second 90 ends.

In still a further variant of the invention, the advertising images 54 are prepared in digital format and the color separation images 106 are produced from the digital format.

In yet a further variant, as illustrated in FIGS. 9–11, the means 114 to print each of the color separation images 106 successively onto the belting member 14, 62 is a silkscreen process 118.

In another variant, the means 114 to print each of the color separation images 106 successively onto the belting member 14, 62 is an offset printing process (not shown).

In still another variant, the means 114 to print each of the color separation images 106 successively onto the belting member 14, 62 is a flexographic printing process (not shown).

In yet another variant, the belting member 14, 62 is formed of materials having antistatic properties.

In yet a further variant, the belting member 14, 62 is formed of polyvinyl chloride material and the upper surface 22, 70 has a matte smooth surface having a hardness ranging from 80 to 90 duro.

In still a further variant of the invention, the belting member 14, 62 is cleaned using a solution that includes agents chosen from the group including: methyl alcohol and toluene.

In another variant, the advertising image 54 to be printed is composed of only spot colors and the inks 126 printed on the belting member 14, 62 are conventional inks.

In yet another variant, the advertising image 54 to be printed is a four-color process image and the inks printed on the belting member are ultraviolet ink.

In still another variant, the inks 126 are cured using an ultraviolet light source (not shown), the ultraviolet light source having a power rating from 100 watts to 300 watts.

In a further variant of the invention, the belting member 14, 62 is moved under the ultraviolet light source at a speed ranging from 20 to 40 feet per minute.

In yet a further variant, the post cure period ranges from 48 to 72 hours.

In still a further variant, as illustrated in FIGS. 7 and 9–11, a method for making a conveyor belt 10 for use in a retail establishment further includes the steps of: Preparing a silkscreen 134 for each color separation image 106. Registering a first of the silk screens 134 to the belting member 14. Printing a first color ink 126 on the belting member 14 through the first silkscreen 134 over the white base coating 50. Removing the first silkscreen 134. Registering, printing through and removing succeeding silk screens 134 for each additional color ink 126 for each advertising image 54.

In yet a another variant, as illustrated in FIGS. 8 and 9–11, a method for making a conveyor belt 10 for use in a retail establishment further includes the steps of: Preparing a silkscreen 134 for each color separation image 106. Registering a first of the silk screens 134 to the belting member 62. Printing a first color ink 126 on the belting member 62 through the first silkscreen 134. Removing the first silkscreen 134. Registering, printing through and removing succeeding silk screens 134 for each additional color ink 126 for each advertising image 54.

In still another variant of the invention, as illustrated in FIGS. 9–11, a method for making a conveyor belt 10 for use in a retail establishment wherein the preparation of a silkscreen 134 for each color separation image 106 further includes the steps of: Preparing a film negative 138 for each color separation image 106. Preparing a frame 142 for each silkscreen 134. Tensioning and securing each silkscreen 134 to one of the frames 142. Registering the film negative 138 on the silkscreen 134. Exposing the silkscreen 134 to a metal halide light source 146 for a period of time ranging from four to seven minutes. Removing the film negative 138 from the silkscreen 134.

In a further variant, the film negative 138 is capable of yielding an image having a resolution of at least 84 lines per screen and 600 dots per inch.

In still a further variant, the silk screens 134 are tensioned on the frames 142 with a force 14–25 newtons.

In yet a further variant, the silkscreen 134 has a mesh count ranging between 230 and 420 cells per square inch.

In another variant, the ink 126 is comprised of an adhesion component and a colored ink component.

In still another variant, the adhesion component is comprised of an adhesion promoter and a mixing clear agent, the adhesion promoter is 0.05% to 20% of the adhesion component by weight with the mixing clear agent is the corresponding percentage of the adhesion component by weight.

In yet another variant, the ink is comprised of 0.05% to 20% adhesion component by weight with the colored ink component is the corresponding percentage of the ink by weight.

In a further variant, the colored ink component is comprised of: acrylated oligomers 20–55% by weight, n-vinyl-2 pyrrolidone 12–25% by weight, and acrylated monomers 8–20% by weight.

In still a further variant, the adhesion promoter is comprised of: urethane 10–20% by weight, xylen 20–25% by weight and n-vinyl pyrrolidone 10–20% by weight.

In yet a further variant, the mixing clear agent is comprised of acrylated monomers 20–60% by weight, furanone 5–10% by weight and cyclohexanome 10–20% by weight.

In a final variant of the invention, the vinyl size material is comprised of: methyl isobutyl ketone 10–20% by weight, 1,3,6-trimethylbenzene 5–10% by weight, xylene 1–5% by weight, vinyl resin 6–10% by weight, light aromatic solvent naptha 20–30% by weight, isophorone 5–10% by weight, vinyl chloride-vinyl acetate-maleic acid terpolyme 1–5% by weight, pseudocumene 20–30% by weight, and cumene 1–5% by weight.

The conveyor belts with advertising and method of making same 10 have been described with reference to particular embodiments. Other modifications and enhancements can be made without departing from the spirit and scope of the claims that follow. cumene 1–5% by weight.

What is claimed is:

1. A conveyor belt with advertising comprising:
   at least one belting member, said belting member having a first predetermined length, an upper surface, a lower surface, first and second parallel side edges and first and second ends;
   at least one advertising image, said advertising image being printed upon said upper surface; and
   means for removably attaching one of said first ends to one of said second ends.

2. A conveyor belt with advertising comprising:
   at least one belting member, said belting member having a first predetermined length, an upper surface, a lower surface, first and second parallel side edges and first and second ends;
   a white base coating, said white base coating being adhered to said upper surface;
   at least one advertising image, said advertising image being printed upon said white base coating; and
   means for removably attaching one of said first ends to one of said second ends.

3. A conveyor belt with advertising comprising:
   at least one belting member, said belting member having a first predetermined length, an upper surface, a lower surface, first and second parallel side edges and first and second ends;
   a vinyl size coating, said vinyl size coating being applied to said upper surface;
   a white base coating, said white base coating being adhered to said upper surface over said vinyl size coating;
   at least one advertising image, said advertising image being printed upon said white base coating; and
   means for removably attaching one of said first ends to one of said second ends.

4. A conveyor belt with advertising comprising:
   at least one belting member, said belting member having a first predetermined length, a upper surface, a lower surface, first and second parallel side edges and first and second ends;
   said belting member being formed of either of white and light-colored material;
   a vinyl size coating, said vinyl size coating being applied to said upper surface;
   at least one advertising image, said advertising image being printed upon said vinyl size coating; and
   means for removably attaching one of said first ends to one of said second ends.

5. A conveyor belt with advertising as described in any one of claims 1–4, wherein said belting member is formed of materials having anti-static properties.

6. A conveyor belt with advertising as described in any one of claims 1–4, wherein said belting member is formed of polyvinyl chloride material and said upper surface has a matte smooth surface having a hardness ranging from 80 to 90 duro.

7. A conveyor belt with advertising as described in any one of claims 1–4, wherein the predetermined length of said belting member is less than an entire length of said conveyor belt, permitting replacement of a portion of said entire length of said conveyor belt.

\* \* \* \* \*